(12) United States Patent
Ishikawa et al.

(10) Patent No.: US 8,120,999 B2
(45) Date of Patent: Feb. 21, 2012

(54) OPTICAL DISC APPARATUS AND DEFOCUS CORRECTING METHOD

(75) Inventors: Yoshinori Ishikawa, Yokohama (JP); Gohshi Jin, Matsudo (JP)

(73) Assignees: Hitachi-LG Data Storage, Inc., Tokyo (JP); Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/767,408

(22) Filed: Apr. 26, 2010

(65) Prior Publication Data

US 2011/0134731 A1 Jun. 9, 2011

(30) Foreign Application Priority Data

Dec. 7, 2009 (JP) ................................. 2009-277141

(51) Int. Cl.
*G11B 7/00* (2006.01)
(52) U.S. Cl. ................................................. 369/44.27
(58) Field of Classification Search .................. None
See application file for complete search history.

(56) References Cited

U.S. PATENT DOCUMENTS

| 4,665,512 | A | * | 5/1987 | Ando | 369/44.23 |
|---|---|---|---|---|---|
| 4,779,255 | A | * | 10/1988 | Sugiyama et al. | 369/44.23 |
| 6,072,762 | A | * | 6/2000 | Kume et al. | 369/116 |
| 6,078,551 | A | | 6/2000 | Komma et al. | |
| 6,104,689 | A | * | 8/2000 | Noguchi | 369/44.23 |
| 7,502,302 | B2 | * | 3/2009 | Watanabe et al. | 369/116 |
| 2002/0008894 | A1 | * | 1/2002 | Hendriks et al. | 359/197 |
| 2002/0105735 | A1 | * | 8/2002 | Kim et al. | 359/784 |
| 2003/0021216 | A1 | * | 1/2003 | Hendriks et al. | 369/112.28 |
| 2003/0090801 | A1 | | 5/2003 | Kimura | |
| 2003/0107979 | A1 | * | 6/2003 | Kim et al. | 369/112.07 |
| 2003/0202451 | A1 | * | 10/2003 | Kimura et al. | 369/112.08 |
| 2004/0004913 | A1 | * | 1/2004 | Wada et al. | 369/44.32 |
| 2004/0100703 | A1 | * | 5/2004 | Kimura et al. | 359/719 |
| 2004/0160885 | A1 | * | 8/2004 | Kimura | 369/112.09 |
| 2004/0257958 | A1 | * | 12/2004 | Kimura et al. | 369/112.03 |
| 2011/0134731 | A1 | * | 6/2011 | Ishikawa et al. | 369/44.23 |

FOREIGN PATENT DOCUMENTS

| EP | 1 022 735 A2 | 7/2000 |
|---|---|---|
| JP | 4-53033 | 2/1992 |
| JP | 2002-288851 | 10/2002 |
| JP | 2008-004227 | 1/2008 |
| WO | WO 2007/145437 A1 | 12/2007 |

OTHER PUBLICATIONS

European Search Report issued in European Patent Application No. EP 10 16 1076, mailed on Dec. 22, 2010.

* cited by examiner

*Primary Examiner* — Peter Vincent Agustin
(74) *Attorney, Agent, or Firm* — McDermott Will & Emery LLP

(57) ABSTRACT

An optical disc apparatus in which a bias of a focusing error signal is changed to a value according to a recording power at timing corresponding to a predetermined address position before starting the recording and a defocus of an opposite polarity is preliminarily caused so as to set off a defocus which occurs at the start of the recording.

12 Claims, 10 Drawing Sheets

OPTICAL DISC APPARATUS AND DEFOCUS CORRECTING METHOD

INCORPORATION BY REFERENCE

The present application claims priority from Japanese application JP2009-277141 filed on Dec. 7, 2009, the content of which is hereby incorporated by reference into this application.

BACKGROUND OF THE INVENTION

The invention relates to an optical disc apparatus and a defocus correcting method for correcting a defocus which is caused due to a chromatic aberration when a recording of data onto an optical disc is started.

In recent years, an optical disc of a high density onto/from which data can be recorded and reproduced has been put into practical use by an optical system obtained by combining a blue-violet laser light source near a wavelength of 400 nm and an objective lens having a numerical aperture (hereinbelow, abbreviated to NA) of 0.85. For example, a Blu-ray Disc (hereinbelow, abbreviated to BD) having a storage capacity of 25 GB or 50 GB has been put into practical use.

As for a light emitting power of the laser light source, although a relatively low power (hereinbelow, called a reproducing power) is used at the time of reproducing data, a relatively high power (hereinbelow, called a recording power) is used at the time of recording data. When the data recording onto the optical disc is started, the light emitting power is switched from the reproducing power to the recording power. However, it has been known that upon switching, a laser wavelength changes instantaneously by about a few nm and what is called a chromatic aberration occurs. When the chromatic aberration occurs, although a defocus occurs, the defocus is soon converged to almost 0 level and becomes a just focus with the elapse of time owing to the tracking operation of a focusing servo. However, since the optical system is not in the just focus state for a period of time until the just focus state is obtained after the start of the recording, recording quality deteriorates.

To solve such a problem, an optical pickup having an optical element for correcting the chromatic aberration has been proposed (for example, refer to the specification of U.S. patent application publication No. 2003/0090801). However, if the chromatic aberration correcting optical element is equipped, such a new problem that the costs of the optical pickup increase occurs. It is, therefore, desirable that the defocus at the time of starting the recording can be corrected in the optical disc apparatus using an optical pickup which does not have the chromatic aberration correcting optical element.

To solve such a problem, for example, in the specification of JP-A-2008-4227, in order to reduce a defocus amount at the moment of starting the recording, a method whereby a focusing error signal (hereinbelow, referred to as an FE signal) and a defocus correction amount which has preliminarily been obtained by learning are added prior to starting the recording has been disclosed.

SUMMARY OF THE INVENTION

The defocus correcting method disclosed in JP-A-2008-4227 has the following problems.

The first problem is as follows.

The method of learning an amount of defocus which occurs at the time of what is called an OPC (Optimum Power Control) in which a test signal is recorded has been disclosed in JP-A-2008-4227. However, when the recording power at the time of the OPC and the optimum recording power at which the best recording quality in an actual user data recording area is obtained differ, the learned defocus amount differs from an amount of defocus which occurs at the time of the optimum recording power in the actual user data recording area. This is because the amount of defocus which occurs in association with the chromatic aberration depends on the recording power. By the above reason, according to JP-A-2008-4227, the defocus correction amount corresponding to the optimum recording power in the actual user data recording area cannot be accurately learned.

The second problem is as follows.

In the system disclosed in JP-A-2008-4227, since the defocus which occurs at the time of starting the OPC is not corrected, quality of the reproduction signal in an OPC head portion deteriorates. Therefore, when the OPC recording portion is reproduced and recording quality is evaluated, the reproduction signal in a predetermined period (hereinbelow, referred to as a period A) from the OPC head portion is shut off. In order to evaluate the recording quality of the OPC portion, it is necessary to record the signal of a predetermined period (hereinbelow, referred to as a period B) or more. Therefore, a length of area which is recorded by the initial recording power of the OPC is equal to the sum of the period A and the period B and the recording area is longer than that in the OPC in the related art. In a write-once type optical disc (for example, BD-R (Blu-ray Disk Recordable)), the OPC area is specified by the written standard. Therefore, the maximum number of times of the OPC which can be executed in one optical disc decreases.

To solve the above two problems, it is desirable that the defocus at the start of the recording can be corrected without executing the learning operation.

It is an object of the invention to provide an optical disc apparatus and a defocus correcting method which can correct a defocus at the start of the recording without executing the learning operation.

The object of the invention can be accomplished by, for example, preliminarily causing a defocus of an opposite polarity so as to reduce a defocus which occurs at the start of the recording.

According to the invention, an optical disc apparatus and a defocus correcting method which can correct a defocus at the start of the recording without executing the learning operation can be provided.

Other objects, features and advantages of the invention will become apparent from the following description of the embodiments of the invention taken in conjunction with the accompanying drawings.

DESCRIPTION OF THE EMBODIMENTS

Embodiments will be described hereinbelow with reference to the drawings.

Embodiment 1

Figure 1:
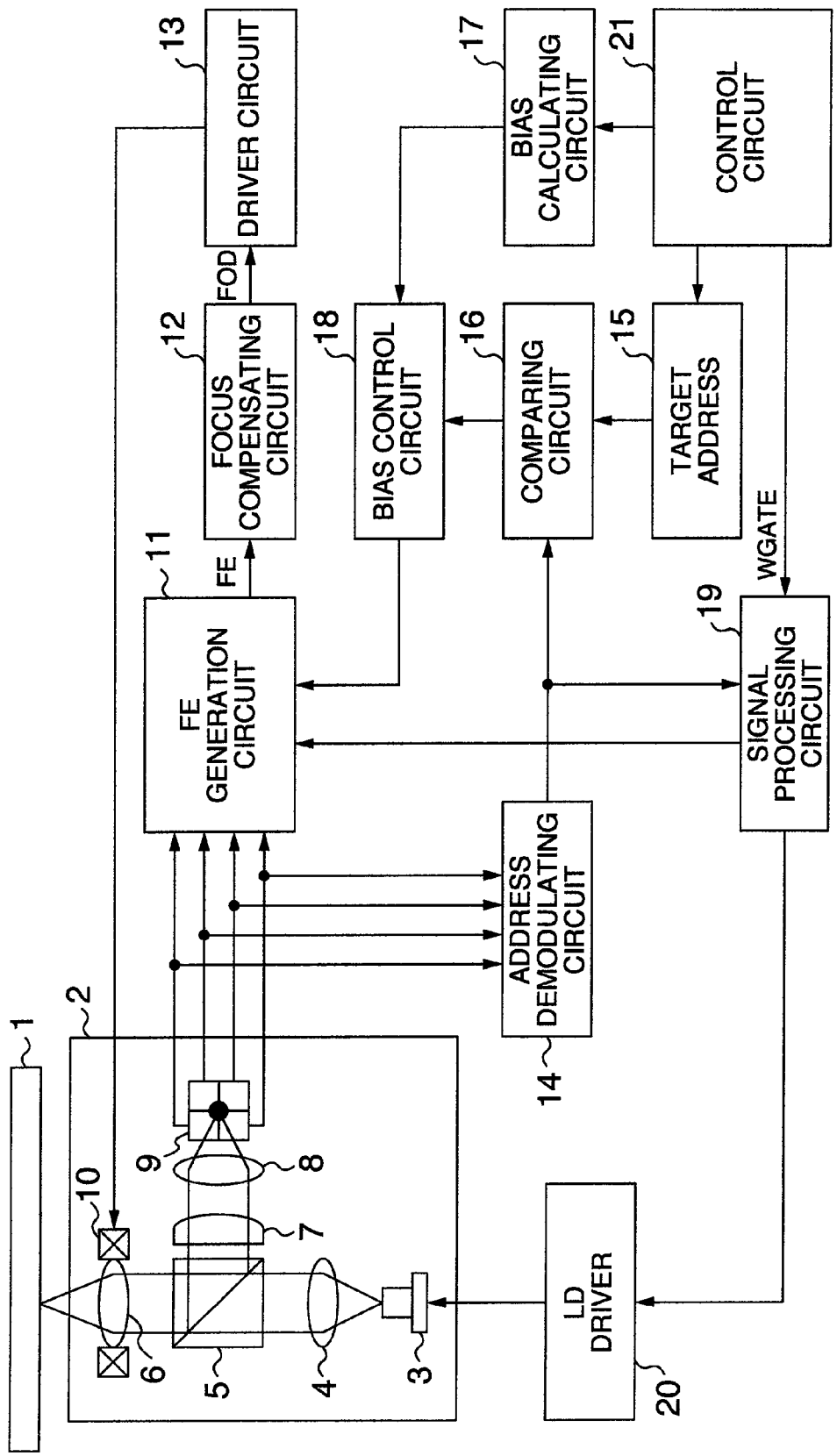
FIG. 1 is a block diagram showing an example of a construction of an optical disc apparatus (embodiment 1, embodiment 3)

FIG. 1 is a block diagram showing an example of a construction of an optical disc apparatus in an embodiment 1.

Reference numeral 1 denotes an optical disc. The optical disc 1 is rotated by a spindle motor (not shown).

Reference numeral 2 denotes an optical pickup. A construction of the optical pickup 2 is as follows.

A laser beam emitted from a laser diode 3 is converted into parallel light by a collimator lens 4, passes through a beam splitter 5 and an objective lens 6, and is converged onto a recording surface of the optical disc 1. The reflection light from the optical disc 1 passes through the objective lens 6 again, is reflected by the beam splitter 5, passes through a cylindrical lens 7 and a condenser lens 8, and is converged onto a 4-split photodetector 9. In the 4-split photodetector 9, an electric signal according to intensity of the received light is outputted from each photodetector. The objective lens 6 can be driven in an almost optical axial direction of the laser beam by a focus actuator 10. The optical pickup 2 also has a tracking actuator (not shown) and the objective lens 6 can be driven in an almost radial direction of the optical disc 1.

Reference numeral 11 denotes a focusing error signal generation circuit for forming an FE signal by using output signals of the 4-split photodetector 9. The focusing error signal generation circuit 11 changes a bias of the FE (Focusing Error) signal in accordance with output signals from a bias control circuit 18 and a signal processing circuit 19, which will be described hereinafter. Such an operation will be described hereinafter.

Reference numeral 12 denotes a focus compensating circuit for outputting a signal obtained by compensating a phase and a gain for the FE signal in order to improve stability and tracking performance of the focusing servo. An output signal of the focus compensating circuit 12 is a focus driving signal and is referred to as an FOD signal hereinbelow.

Reference numeral 13 denotes a driver circuit for amplifying the FOD signal and supplying to the focus actuator 10 in the optical pickup 2.

Reference numeral 14 denotes an address demodulating circuit for demodulating address information of the optical disc 1 by using the output signal of the optical pickup 2 and outputting.

Reference numeral 15 denotes a target address storing unit in which a target address, which will be explained hereinafter, is set by a control circuit 21, which will be described hereinafter.

Reference numeral 16 denotes a comparing circuit for comparing the address information which is outputted by the address demodulating circuit 14 with the target address and outputting a pulse signal of the High level when both of them coincide.

Reference numeral 17 denotes a bias calculating circuit for receiving recording power information from the control circuit 21, calculating a bias amount corresponding to the recording power information, and outputting.

Reference numeral 18 denotes the bias control circuit. When it is detected that the comparing circuit 16 has outputted the pulse signal of the High level, the bias control circuit 18 sets a bias corresponding to the bias amount as an output signal of the bias calculating circuit 17 into the focusing error signal generation circuit 11.

Reference numeral 19 denotes the signal processing circuit for outputting a signal obtained by executing a signal process according to a predetermined recording format to data supplied from the control circuit 21. The signal processing circuit 19 allows the recording to be started from timing when the address information reaches a predetermined value. The signal processing circuit 19 also outputs a WGATE signal showing that the recording operation is being executed, and supplies to the focusing error signal generation circuit 11. In the embodiment, it is assumed that when the WGATE signal is at the High level, the laser diode emits the light by the recording power and when it is at the Low level, the laser diode emits the light by the reproducing power.

Reference numeral 20 denotes a laser diode (LD) driver for driving the laser diode 3 in accordance with the output signal of the signal processing circuit 19 so as to emit the light.

Reference numeral 21 denotes the control circuit for controlling the whole optical disc apparatus. A general CPU having a timer circuit and the like therein can be used as a control circuit 21. The control circuit 21 has an interface circuit (not shown) and can be connected to an external apparatus through the interface circuit. The external apparatus is, for example, a general personal computer or the like and is an apparatus for executing the data recording and reproducing operation to the optical disc 1.

Subsequently, a construction of the focusing error signal generation circuit 11 will be described in detail.

Figure 2:
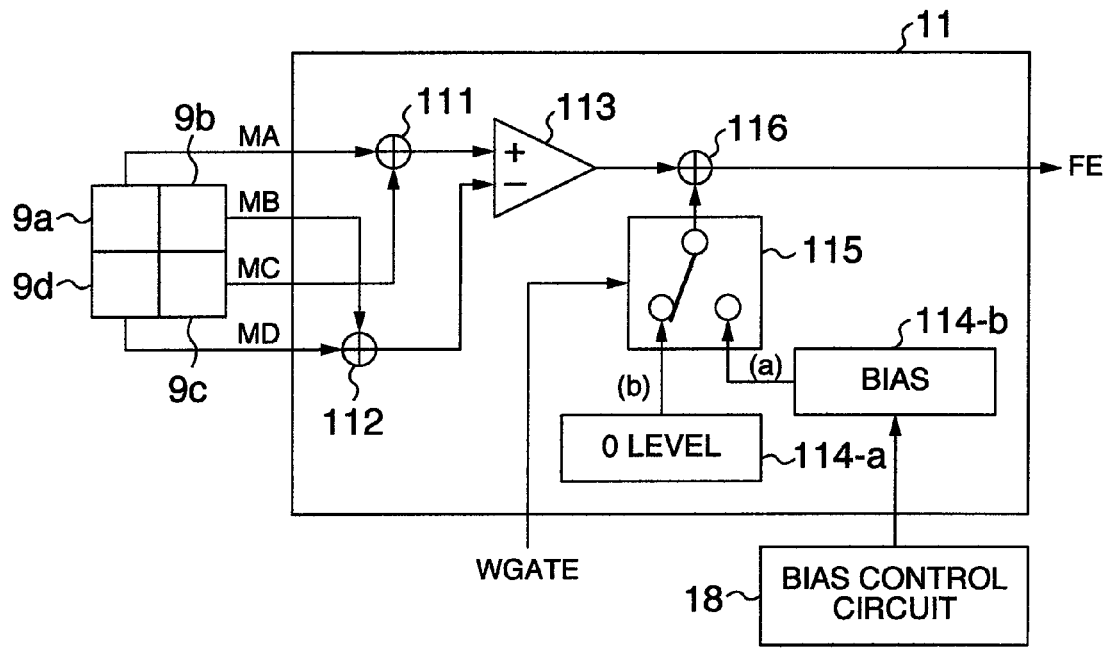
FIG. 2 is a block diagram showing an example of a construction of a focusing error signal generation circuit (embodiment 1)

FIG. 2 is a block diagram showing an example of the construction of the focusing error signal generation circuit 11.

A detecting surface of the 4-split photodetector 9 is divided into component elements of photodetectors 9a, 9b, 9c, and 9d. Output signals of the photodetectors are assumed to be MA, MB, MC, and MD, respectively. The outputs MA and MC of the photodetectors 9a and 9c arranged on a diagonal line are added by a first adding circuit 111. The outputs MB and MD of the photodetectors 9b and 9d arranged on another diagonal line are added by a second adding circuit 112. Further, a difference between outputs of the adding circuits 111 and 112 is calculated by a subtracting circuit 113. Therefore, an output signal of the subtracting circuit 113 is equal to (MA+MC)−(MB+MD) and the FE signal based on a well-known astigmatism method is obtained.

A predetermined bias level is set into the first bias setting circuit 114-a by the bias control circuit 18. An output signal of the first bias setting circuit 114-a is supplied to an input terminal a of a switching circuit 115.

The 0 level is set into a second bias setting circuit 114-b. An output signal of the second bias setting circuit 114-b is supplied to an input terminal b of the switching circuit 115. The switching circuit 115 is switched to either the input terminal a side or the input terminal b side in response to the WGATE signal which is supplied from the signal processing circuit 19. In FIG. 2, when the WGATE signal is at the Low level (reproducing power light emission), the switching circuit 115 is switched to the input terminal a side and, when it is at the High level (recording power light emission), the switching circuit 115 is switched to the input terminal b side. An output signal of the switching circuit 115 becomes the bias level which is added to the FE signal.

The bias level which is outputted from the switching circuit 115 is added to the output signal of the subtracting circuit 113 by a third adding circuit 116, thereby obtaining the FE signal which is used in the focusing servo operation.

An example of a waveform showing an example of the operation of the focusing error signal generation circuit 11 which outputs the FE signal mentioned above is shown in FIG. 3. An axis of abscissa in FIG. 3 indicates a defocus amount and an axis of ordinate indicates a signal level. It is assumed that when the defocus amount has a + polarity, this module that a laser spot is located on the rear side of the recording surface, that is, it is located in such a direction that it is away from the optical pickup 2. When the defocus amount has a − polarity, this module that the laser spot is located on this side of the recording surface, that is, it is located in such a direction that it approaches the optical pickup 2.

Figure 3:
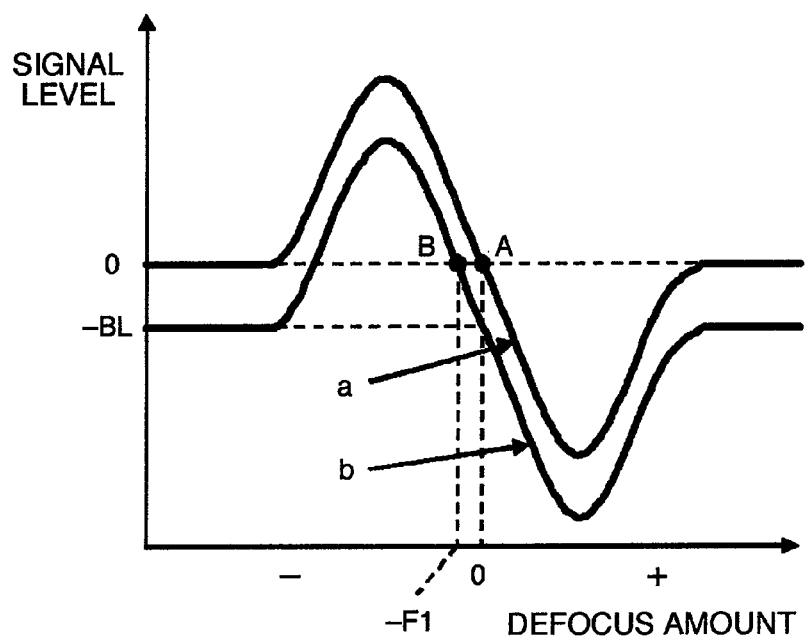
FIG. 3 is a waveform diagram showing an example of the operation of the focusing error signal generation circuit (embodiment 1)

A waveform a in FIG. 3 indicates the FE signal in the case where the WGATE signal is at the High level (recording power light emission). Since the switching circuit 115 outputs the signal of 0 level which is supplied to the input terminal b as an addition bias, the FE signal has a well-known S-character waveform which is vertically symmetrical. A waveform b in FIG. 3 indicates the FE signal in the case where the WGATE signal is at the Low level (reproducing power light emission). It is assumed that a bias level (−BL) has been preset into the bias setting circuit 114 by the bias control circuit 18. Since the switching circuit 115 outputs the bias level (−BL) which is supplied to the input terminal a as an addition bias, the waveform b becomes a waveform which is offset from the waveform a by −BL.

The 0 level of the waveform a is located at a point A in the diagram and the 0 level of the waveform b is likewise located at a point B. Since the focusing servo makes control so that the FE signal is set to 0, when WGATE=Low (reproducing power light emission), a position which is defocused from the recording surface of the optical disc 1 by a distance (−F1) in FIG. 3 corresponding to the point B becomes a just-focus position.

Subsequently, the operation of the bias calculating circuit 17 will be described in detail.

Figure 4:
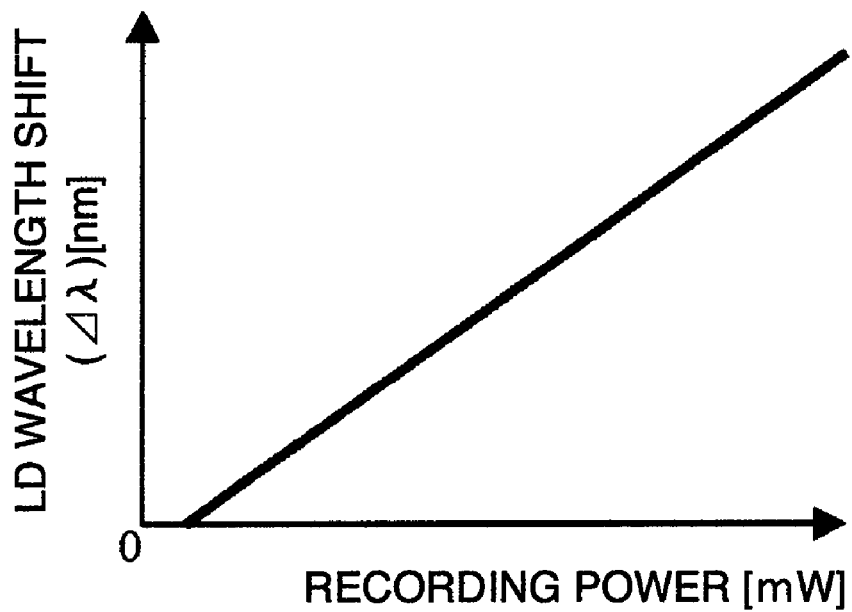
FIG. 4 is a schematic diagram showing an example of a relation between a recording power and a wavelength shift of a laser diode.
Figure 5:
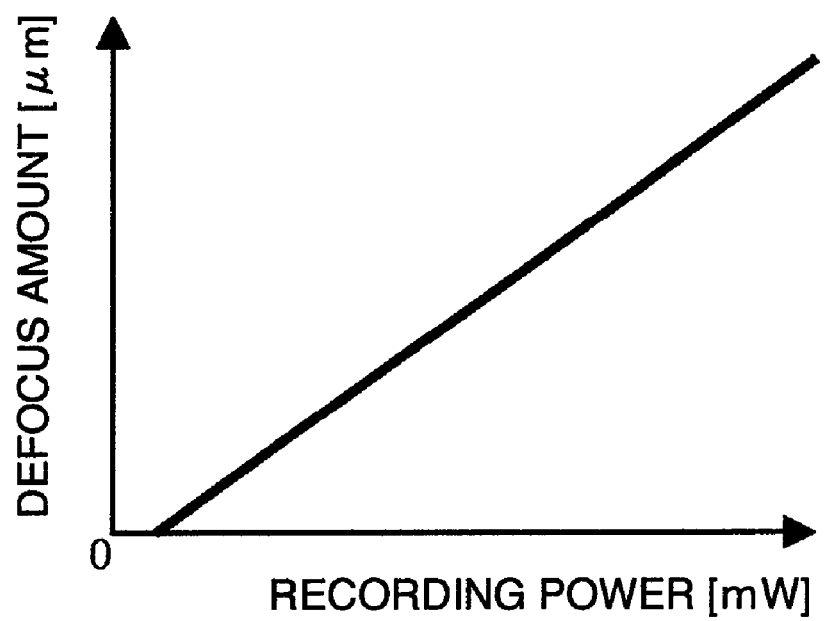
FIG. 5 is a schematic diagram showing an example of a relation between the recording power and a defocus amount.

FIG. 4 is a schematic diagram showing an example of a relation between the recording power and a wavelength shift of the laser diode 3. When the recording power is equal to the reproducing power, since no chromatic aberration occurs, the LD (laser diode) wavelength shift is equal to 0. However, as the recording power is higher than the reproducing power, the LD wavelength shift increases. The defocus occurs due to the LD wavelength shift and its defocus amount is proportional to the LD wavelength shift. This state is shown in FIG. 5 and when the recording power is the same as the reproducing power, the defocus amount is equal to 0. However, as the recording power increases, the defocus amount also increases. A relation between the recording power and the defocus amount shown in FIG. 5 is determined by an optical design of the optical pickup 2. Therefore, the bias calculating circuit 17 is constructed in such a manner that the relation between the recording power and the defocus amount shown in FIG. 5 is stored, the information of the recording power is received from the control circuit 21, and the defocus amount can be calculated in accordance with the information.

For example, assuming that the recording power in FIG. 5 is equal to X and the defocus amount is equal to Y, the relation is obtained by the following equation (1)

$$Y = M \cdot X + N \tag{1}$$

where,

M and N: constants which are decided by the optical design of the optical pickup 2

The bias calculating circuit 17 preliminarily stores the constants M and N and calculates the defocus amount Y in accordance with the recording power X and the equation (1). The bias calculating circuit 17 further calculates a bias amount adapted to generate a defocus amount (−Y) of the polarity opposite to that of the calculated defocus amount Y. Since the bias amount adapted to generate the defocus amount (−Y) is determined by the optical design of the optical disc apparatus, more specifically, by the tangential sensitivity of the FE signal at the defocus amount of zero, it is sufficient to construct the bias calculating circuit 17 in such a manner that the tangential sensitivity of the FE signal at the defocus amount of zero is preliminarily stored and the bias amount is calculated from the defocus amount in accordance with it. It is desirable to construct in such a manner that the tangential sensitivity of each of the constants M and N can be set into the bias calculating circuit 17 by the control circuit 21.

Figure 6:
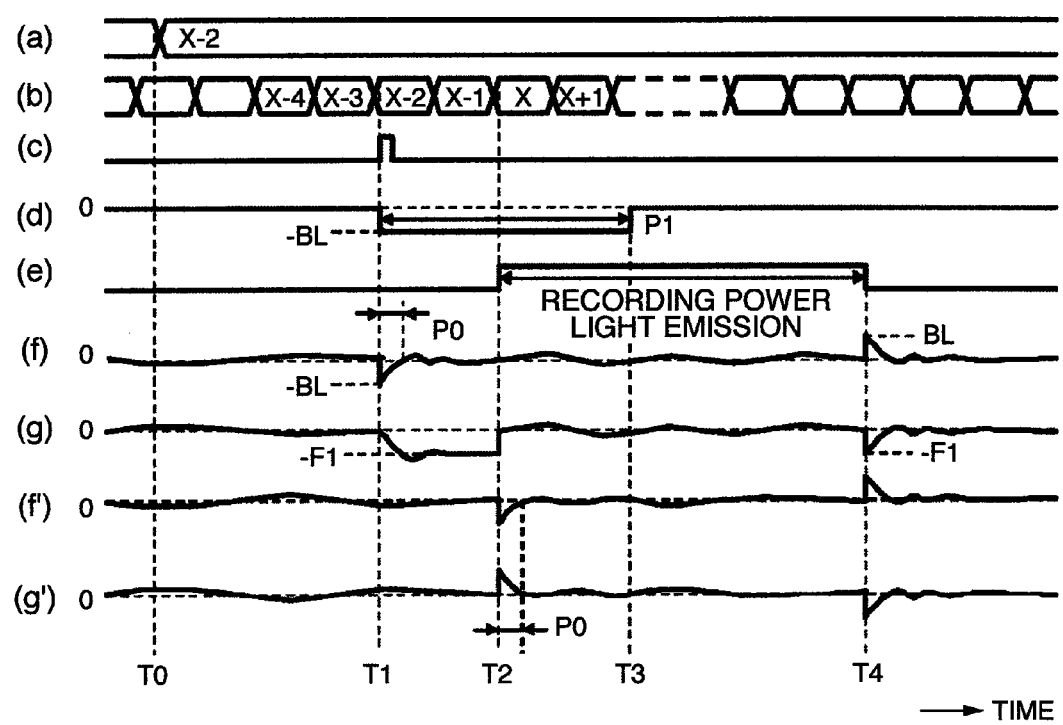
FIG. 6 is a waveform diagram for explaining an example of the defocus correcting operation (embodiment 1, embodiment 2)

A description will be made hereinbelow by using a waveform diagram of FIG. 6 showing an example of the defocus correcting operation in the embodiment 1 in the construction mentioned above.

In FIG. 6, a waveform (a) indicates the output signal of the target address storing unit 15; a waveform (b) the address information which is outputted from the address demodulating circuit 14; a waveform (c) the output signal of the comparing circuit 16; a waveform (d) the output signal of the bias setting circuit 114-a; a waveform (e) the WGATE signal; and a waveform (f) the FE signal which is outputted from the adding circuit 116. A waveform (g) indicates a waveform showing the defocus amount. Although the waveform (g) does not indicate the output signal of the component element in FIG. 1, it is illustrated in the diagram for the purpose of assisting the understanding of the embodiment. Waveforms (f') and (g') are waveforms showing the FE signal and the defocus amount in the case where the embodiment is not applied and are illustrated for comparison.

When the recording operation is started (WGATE signal (e)=High) at time T2, the chromatic aberration occurs in association with a change in light emitting power of the laser diode 3. In the case where the embodiment is not applied, the defocus occurs in a period P0 until the focusing servo traces as shown in the waveform (g'). At this time, a level of the FE signal (f') changes transiently. Since the defocus has occurred in the period P0, recording quality deteriorates.

The following countermeasure is taken in the embodiment in order to solve the above problem.

Prior to recording from a recording start address X in FIG. 6, the control circuit 21 sets the target address into the target address storing unit 15 at time T0. In the embodiment, it is assumed that (X−2) is set as a target address.

When the tracking servo traces the rotating optical disc 1 and a target address (a) and address information (b) coincide at time T1, the comparing circuit 16 outputs a signal of a High pulse (waveform (c)). When the High pulse of the comparing circuit output (c), the bias control circuit 18 sets the bias level which is supplied from the bias calculating circuit 17 into the bias setting circuit 114 in the focusing error signal generation circuit 11. In the embodiment, it is assumed that the bias level (−BL) adapted to generate the defocus amount (−F1) described in FIG. 3 is set (waveform (d)). Therefore, although the FE signal (f) changes momentarily to the same level as the bias level (−BL), when the focusing servo traces and is stabilized, the FE signal (f) is converged to the 0 level again. At this time, the defocus amount (g) is converged to the defocus amount (−F1) corresponding to the bias level (−BL). A convergence time of the focusing servo at this time is almost the same as the period P0 described in the waveform (g'). The period P0 is determined by a focusing servo band. When the band is designed so as to be equal to about 5 kHz, the period P0 is equal to about 200 μsec.

In this state, when the address information (b) coincides with the recording start address X at time T2, the data recording operation is started to the optical disc 1 and the WGATE signal (e) is set to the High level. Therefore, the switching circuit 115 in the focusing error signal generation circuit 11 is switched to the input terminal b side.

When the recording operation is started, the light emitting power of the laser diode 3 rises and the defocus F1 associated with the chromatic aberration occurs momentarily. However, since the focusing servo is operating by the defocus amount (−F1) of the polarity opposite to that of the generated defocus amount F1 at time T2, the defocus amount F1 which occurs in association with the occurrence of the chromatic aberration is set off. Therefore, the defocus amount (g) is set to 0 and a transient level change does not occur in the FE signal (f). Since the generation of the defocus at the start of the recording can be prevented by the above operation, the good recording quality in the recording start portion can be held.

When the recording operation is finished at time T4, since the WGATE signal (e) is set to the Low level, the switching circuit 115 in the focusing error signal generation circuit 11 is switched to the input terminal a side. If the bias level (d) is held at −BL here, it becomes a cause of deterioration in subsequent seeking operation or reproducing performance. Therefore, the bias control circuit 18 returns the bias level (d) to the 0 level at time T3 after the elapse of a predetermined time P1 from time T1 when the bias level (d) has been set to −BL. It is desirable here that the timing T3 when the bias level (d) is returned to the 0 level is located at a point of time during the recording period of time. This is because since the switching circuit 115 in the focusing error signal generation circuit 11 has been switched to the input terminal b side and the output signal of the bias setting circuit 114 is not used during the recording period of time, even if the bias level (d) is changed during the recording, no influence is exerted on the focusing servo operation.

When the recording operation is finished at time T4 and the switching circuit 115 in the focusing error signal generation circuit 11 is switched to the input terminal a side, the bias level (d) has been returned to the 0 level by the above operation. At this time, the light emitting power of the laser diode 3 is switched from the recording power to the reproducing power. Therefore, the defocus amount (−F1) of the polarity opposite to that at the start of the recording occurs. Consequently, although the FE signal (f) changes to the level BL corresponding to the defocus amount (−F1), when the focusing servo traces and is stabilized, the FE signal (f) is converged to the 0 level again.

Although the operation for returning the bias level (d) to the 0 level at time T3 when the predetermined period P1 elapses after the bias level (d) was set at time T1 has been described above, another operation may be executed. For example, it is also possible to construct in such a manner that the WGATE signal is supplied to the bias control circuit 18, a timer circuit is provided in the bias control circuit 18, a time measurement by the timer circuit is started from the recording start time T2 at which the WGATE signal is set to the High level, and the bias level (d) is returned to the 0 level at the timing when the measuring time has elapsed by a predetermined period. If the predetermined period is preset to 0, such an operation as to return the bias level (d) to the 0 level at the recording start time T2 can be also performed.

As another construction to return the bias level (d) to the original level, for example, the bias level (d) may be returned to the 0 level at the timing when the data of an amount corresponding to predetermined addresses from the recording start has been recorded. As a method of realizing such a construction, it is sufficient to construct in such a manner that the control circuit 21 sets a bias level recovery target address into the target address storing unit 15 at timing after the recording start time T2 and the bias control circuit 18 detects that the address information (a) coincides with the recovery target address, and returns the bias level (d) to the 0 level.

In any of the foregoing cases, it is desirable that the timing for returning the bias level (d) to the 0 level is located at a point of time during the recording period of time. However, if no inconvenience occurs in the servo operation until the seeking or reproduction is executed after the recording operation was finished in a state where the bias level (d) has been set to the level (−BL), it is also possible to construct in such a manner that after the recording operation was finished, the bias level (d) is returned to the 0 level.

The foregoing construction in which the bias level (d) is returned to the original level is not limited to the embodiment but can be also similarly applied to other embodiments, which will be described hereinafter.

Figure 7:
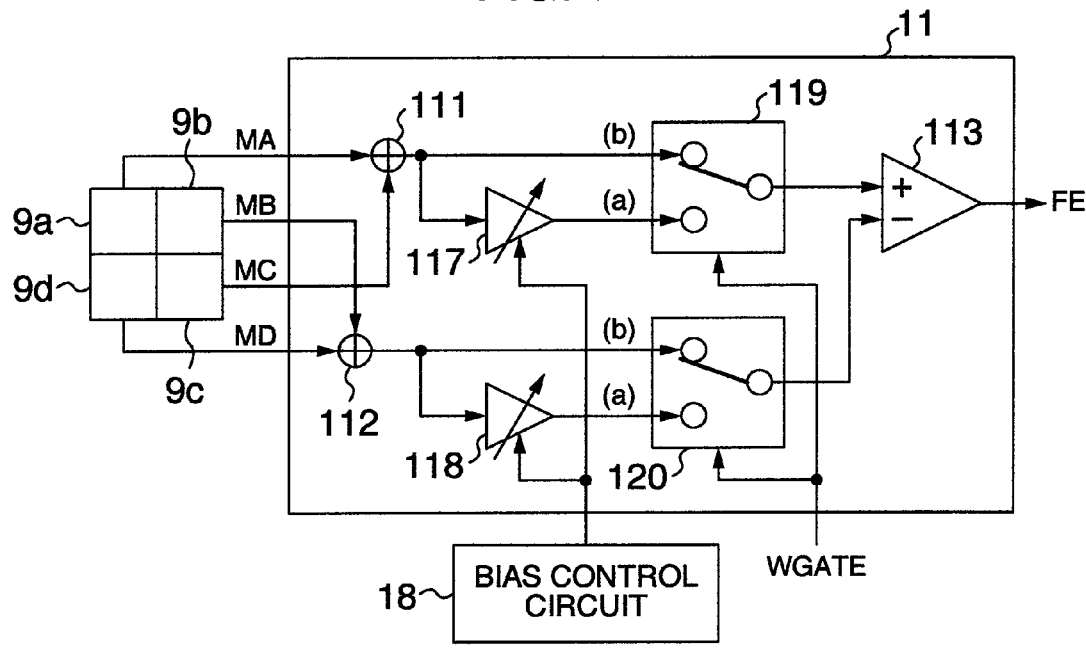
FIG. 7 is a block diagram showing an example of another construction of the focusing error signal generation circuit (embodiment 1)

The bias changing module of the FE signal is not limited to that of the construction shown in FIG. 2. FIG. 7 is a block diagram showing an example of another construction of the focusing error signal generation circuit 11. The same component elements as those in FIG. 2 are designated by the same reference numerals and their description is omitted here.

(MA+MC) as an output signal of the first adding circuit 111 is supplied to an input terminal b of a switching circuit 119 and to a first variable gain amplifier 117. (MB+MD) as an output signal of the second adding circuit 112 is supplied to an input terminal b of a switching circuit 120 and to a second variable gain amplifier 118.

An output signal of the first variable gain amplifier 117 is supplied to an input terminal a of the switching circuit 119. An output signal of the second variable gain amplifier 118 is supplied to an input terminal a of the switching circuit 120. The subtracting circuit 113 calculates a difference between the output signal of the switching circuit 119 and the output signal of the switching circuit 120 and outputs, thereby obtaining the FE signal. The switching circuits 119 and 120 are controlled by the WGATE signal. When the WGATE signal is at the Low level (reproducing power light emission), each of the switching circuits 119 and 120 is switched to the input terminal a side and, when it is at the High level (recording power light emission), each of them is switched to the input terminal b side. Gains of the variable gain amplifiers 117 and 118 are set by the bias control circuit 18.

Figure 8:
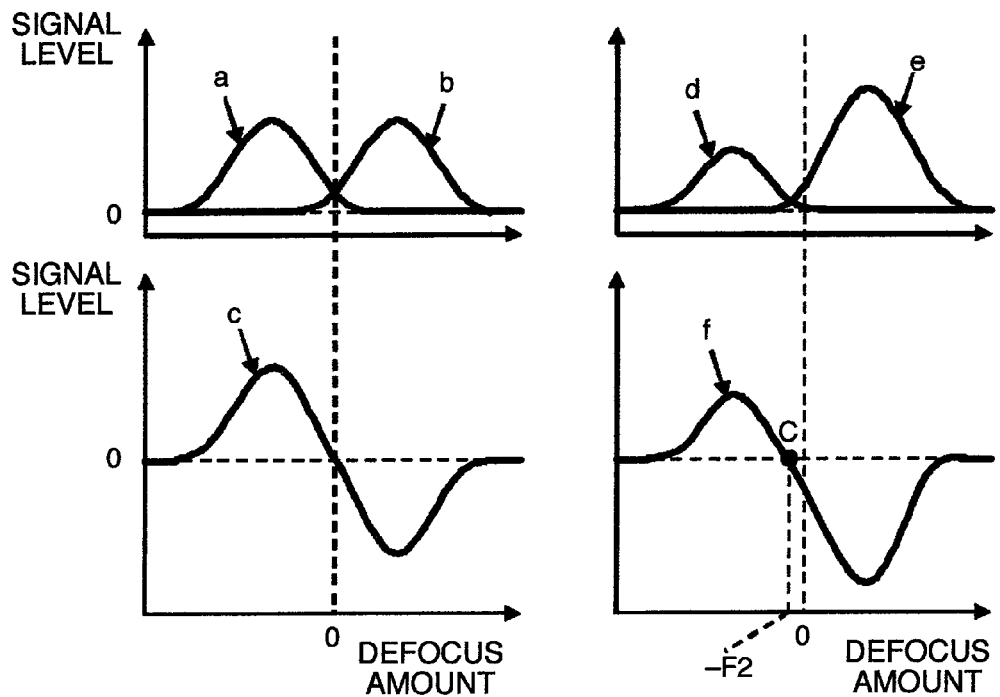
FIG. 8 is a waveform diagram showing an example of the operation in another construction of the focusing error signal generation circuit (embodiment 1)

FIG. 8 is a waveform diagram showing an example of the operation in another construction of the focusing error signal generation circuit 11 shown in FIG. 7.

The left waveforms in FIG. 8 are waveforms in the case where the WGATE signal is at the High level (recording power light emission) and both of the switching circuits 119 and 120 have been switched to the input terminal (b) side. A waveform a in FIG. 8 indicates the signal of (MA+MC) which is outputted by the first adding circuit 111 and a waveform b indicates the signal of (MB+MD) which is outputted by the second adding circuit 112. A waveform c indicates the FE signal which is outputted by the subtracting circuit 113. The waveforms a and b are mountain-shaped waveforms which are set to maximum levels at the different defocus amounts and whose signal levels decrease at other defocus amounts.

The right waveforms in FIG. 8 are waveforms in the case where the WGATE signal is at the Low level (reproducing power light emission) and both of the switching circuits 119 and 120 have been switched to the input terminal (a) side. A waveform d in FIG. 8 indicates the output signal of the first variable gain amplifier 117 and a waveform e indicates the output signal of the second variable gain amplifier 118. It is assumed here that the gain of the first variable gain amplifier 117 has been set to, for example, 0.8 times by the bias control circuit 18. Therefore, a signal amplitude of the waveform d is equal to 0.8 times as large as that of the waveform a as an output signal of the first adding circuit 111. It is assumed here that the gain of the second variable gain amplifier 118 has been set to, for example, 1.2 times by the bias control circuit 18. Therefore, the signal amplitude of the waveform e is equal to 1.2 times as large as that of the waveform b as an output signal of the second adding circuit 112. At this time, since the subtracting circuit 113 calculates the difference between the waveforms d and e and outputs, the FE signal has a waveform which is vertically unbalanced as shown by the waveform f and its 0 level is located at a point C in the diagram. Thus, in this state, the control by the focusing servo is made in a state where the defocus of (−F2) shown in FIG. 8 has occurred. Since the defocus can be applied to the focus control even by the method of changing the balance of the FE signal as mentioned above, the defocus at the time of the recording start can be corrected in a manner similar to FIG. 6.

The actual optical disc apparatus generally uses such a construction that an AGC (Auto Gain Control) circuit is built in the focusing error signal generation circuit 11. Since the amplitude of the FE signal changes according to an amount of reflection light from the optical disc 1, a focusing servo gain fluctuates in association with such an amplitude change. Therefore, the focusing servo gain is held to a predetermined value by using the AGC circuit for correcting the amplitude of the FE signal in accordance with the amount of reflection light from the optical disc 1 (for example, the sum of the output signals of the 4-split photodetector 9). In the case of using the AGC circuit in the focusing error signal generation circuit 11 shown in FIG. 2, it is desirable to provide the AGC circuit between the subtracting circuit 113 and the adding circuit 116 and to add the bias level to an output signal of the AGC circuit. This is because the amplitude of the FE signal which is outputted by the AGC circuit has been corrected to the predetermined value and, when the bias level which is outputted by the switching circuit 115 is added by the adding circuit 116, a predetermined defocus amount can be obtained irrespective of the reflection light amount of the optical disc 1.

In the case of using the AGC circuit in the focusing error signal generation circuit 11 shown in FIG. 7, its setting position may be any one of the post stage of the adding circuits 111 and 112, the post stage of the switching circuits 119 and 120, the post stage of the subtracting circuit 113, and the like. The reason of it is that in the case of the system for changing the balance of the FE signal by the variable gain amplifiers 117 and 118, the defocus amount does not depend on the amplitude of the FE signal.

As mentioned above, in the embodiment, the bias level is set into the FE signal at predetermined address timing before a recording start address. A method of deciding the predetermined address will be described hereinbelow.

Figure 11:
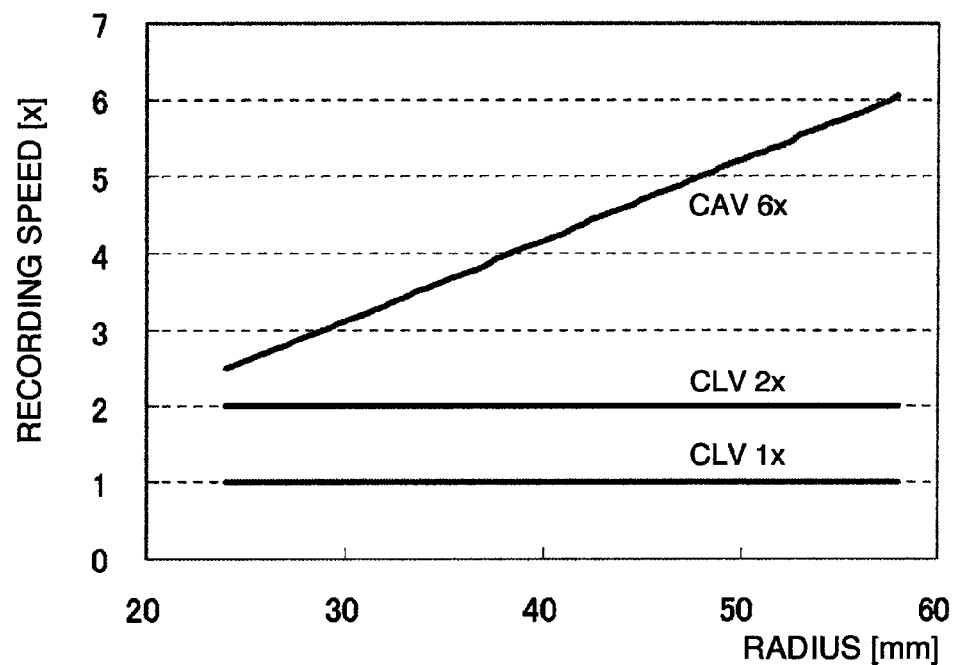
FIG. 11 is a schematic diagram showing an example of a relation between a disc radius of a BD and a recording speed.

FIG. 11 shows an example of a recording speed of the BD (Blu-ray Disk). An axis of abscissa indicates a disc radial position and an axis of ordinate indicates the recording speed. The recording speed in the case of recording at a standard linear velocity is expressed by 1×. The recording speed in the case of recording at a speed that is twice as high as the standard linear velocity is expressed by 2×. This is true of other speeds. FIG. 11 shows an example of 1× and 2× of the constant linear velocity (hereinbelow, abbreviated to CLV) and 6× of the constant angular velocity (hereinbelow, abbreviated to CAV). In the case of CLV control, there is no change between the recording speed at the inner rim of the disc and that at the outer rim. In the case of CAV control, as the recording position moves from the inner rim to the outer rim, the recording speed rises.

Figure 12:
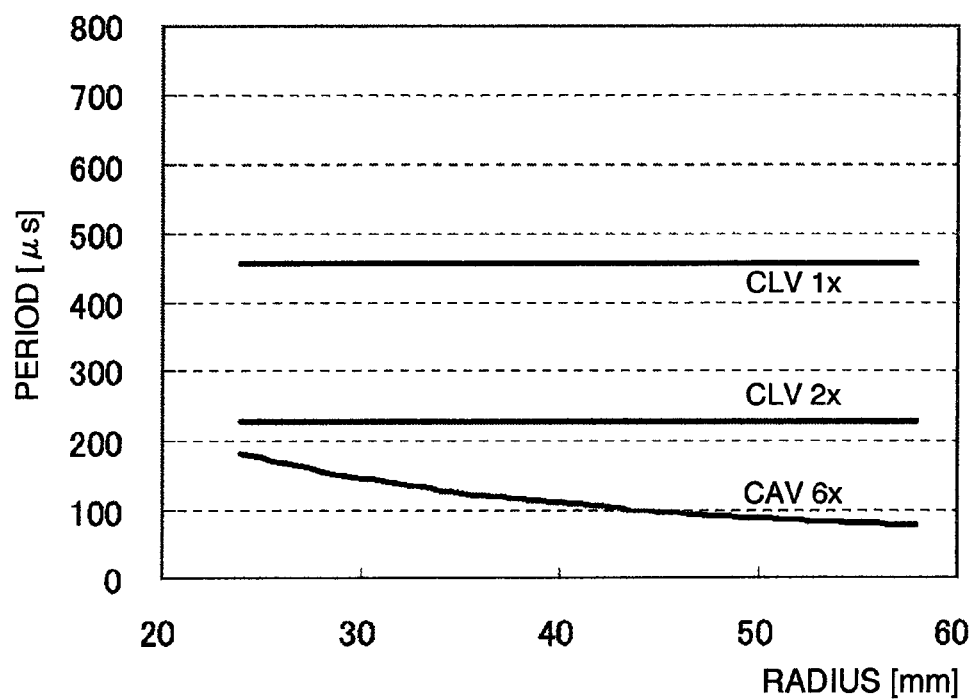
FIG. 12 is a schematic diagram showing an example of a relation between the disc radius of the BD and one sector period.

It is assumed that a physical length of one sector in the optical disc 1 is constant for the whole circumference of the disc. A 1-sector period is shown in FIG. 12. In the CLV control, since the linear velocity at the inner rim of the disc and that at the outer rim are constant, the 1-sector period is also constant. In the CAV control, since the linear velocity at the outer rim is higher than that at the inner rim, the 1-sector period at the outer rim is shorter than that at the inner rim. When a servo convergence time (about 200 μsec) at the time of changing the focus bias and the 1-sector period are compared, in the case of CLV 1×, the 1-sector period is equal to 400 μsec or more and has an enough margin larger than the servo convergence time. Therefore, even if the predetermined address is set to the position which is located before the recording start address by one sector, there will be no problem. In the case of CLV 2×, the 1-sector period is equal to about 230 μsec and has a margin smaller than the servo convergence time (about 200 μsec). In CLV 2×, therefore, it is desirable to set the predetermined address to the position which is located before the recording start address by two sectors.

In CAV 6×, the 1-sector periods at all radial positions are equal to the servo convergence time (about 200 μsec) or less. Therefore, if the predetermined address is set to the position which is located before the recording start address by three sectors, a time of the servo convergence time (about 200 μsec) or more can be assured at all of the radial positions. For example, if the position is located at the inner rim than a radius of 40 mm, even if the predetermined address is set to the position which is located before the recording start address by two sectors, a time of the servo convergence time (about 200 μsec) or more can be assured. That is, a system in which the predetermined address is switched in accordance with the radial position where the recording is started may be used.

As mentioned above, it is also possible to change the predetermined address in accordance with the recording speed and the recording start radial position. Since the radial position corresponds to the address of the optical disc in a one-to-one relational manner, the radial position may be replaced by the address position.

Further, the predetermined address may be set to a position which is located before the recording start address by sectors more than two or three sectors or may be set to a position which is located before the recording start address by such a length that does not exert an influence on the recording and reproducing operation of the optical disc apparatus. For example, since there is a case using such a construction that the control circuit 21 operates on a 1-ECC block length unit basis, the predetermined address may be set to a position before the recording start address on a 1-ECC block length unit basis, for example, it may be set to a position which is located before the recording start address by one ECC block, two ECC blocks, or the like. In the case of the BD, the 1-ECC block is equal to a length of 32 sectors.

The method of deciding the predetermined address is not limited to the embodiment but can be also similarly applied to other embodiments, which will be described hereinbelow.

According to the embodiment 1 described above, at the timing when the address information of the optical disc is set to the predetermined address before the recording start, the defocus is applied so as to set off the defocus which is caused in association with the recording light emission, no defocus occurs at the time of the recording start. Consequently, the good recording quality in the recording start portion can be held. Since the amount of defocus which is applied is calculated from the recording power, the learning operation is unnecessary. Thus, the defocus amount according to the optimum recording power can be set.

Embodiment 2

The operation to correct the defocus at the start of the recording by the hardware processes has been described in the embodiment 1. The operation to correct the defocus at the start of the recording by software processes will now be described in the embodiment.

Figure 9:
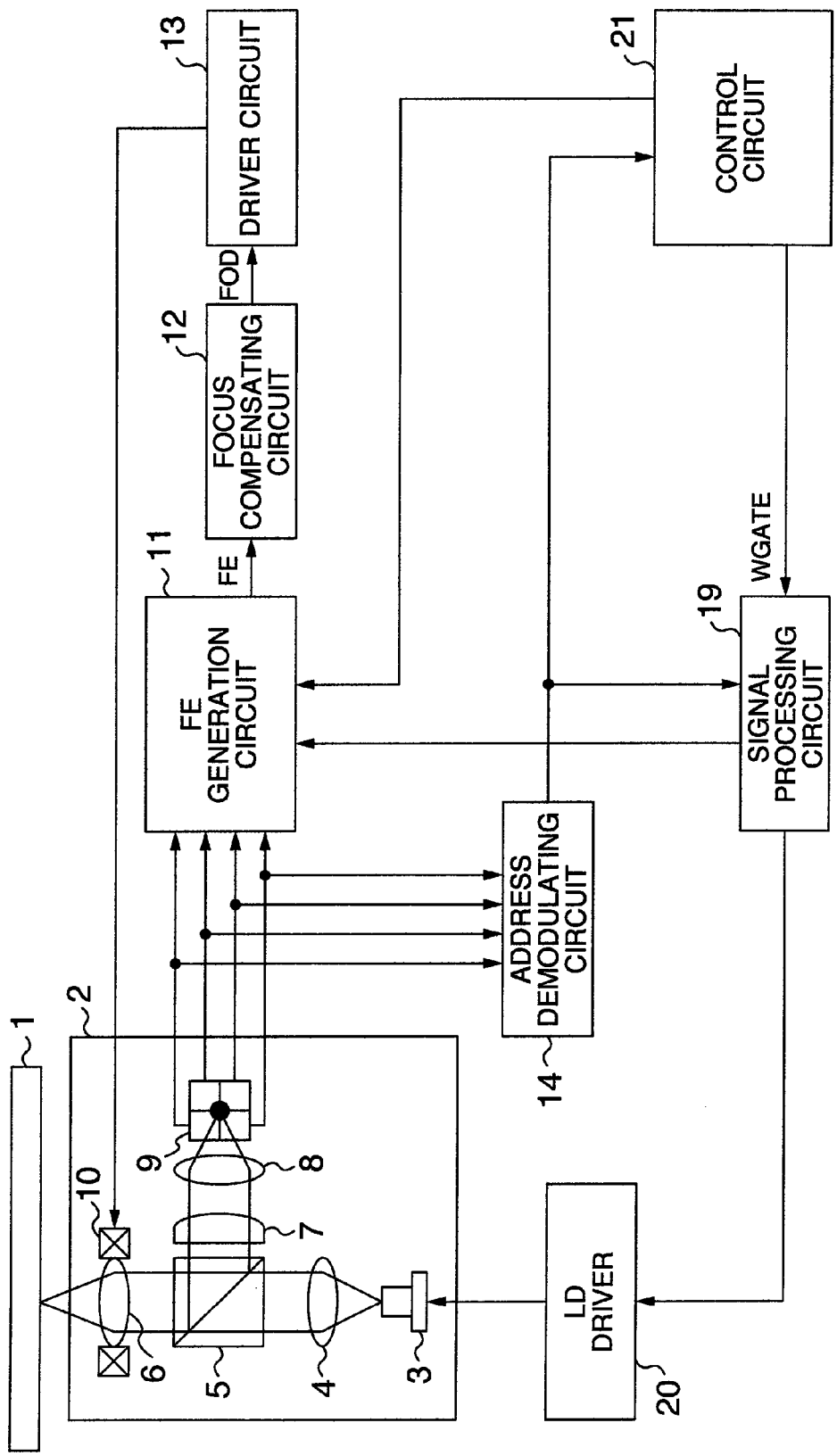
FIG. 9 is a block diagram showing an example of a construction of an optical disc apparatus (embodiment 2, embodiment 4)

FIG. 9 is a block diagram showing an example of a construction of an optical disc apparatus in the embodiment.

FIG. 9 differs from FIG. 1 showing the optical disc apparatus in the embodiment 1 with respect to a point that the target address storing unit 15, comparing circuit 16, bias calculating circuit 17, and bias control circuit 18 are not included and it is assumed that the functions of those component elements are executed by software processes by the control circuit 21. The control circuit 21 has such a construction that the address information which is outputted from the address demodulating circuit 14 is supplied and the bias setting circuit 114-a in the focusing error signal generation circuit 11 or the variable gain amplifiers 117 and 118 can be set. Although the focusing error signal generation circuit 11 may have the construction of either FIG. 2 or FIG. 4 in the embodiment 2 in a manner similar to the embodiment 1, it is assumed that the construction of FIG. 2 is used in the following description.

Figure 10:
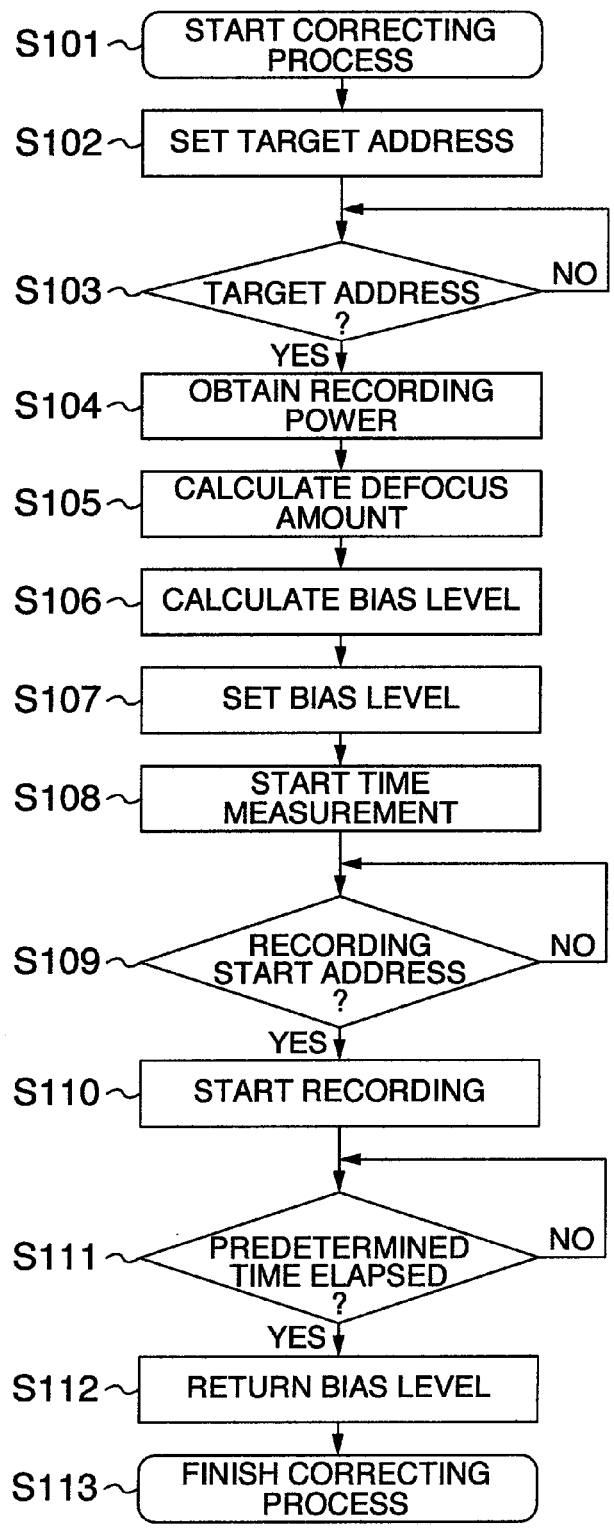
FIG. 10 is a flowchart showing an example of the defocus correcting operation (embodiment 2)

FIG. 10 is a flowchart showing an example of the defocus correcting operation in the embodiment. This processing flow is executed by the software processes by the control circuit 21. In the embodiment, the recording start address adapted to start the recording of information onto the optical disc is set to X and the target address adapted to make the defocus correction is set to (X−2). Operation waveforms in the embodiment are substantially the same as those in FIG. 6 in the embodiment 1.

When the correcting process is started (step S101), the control circuit 21 sets the target address (X−2) for making the defocus correction therein at time T0 in FIG. 6 (step S102).

Subsequently, the control circuit 21 monitors the address information which is outputted from the address demodulating circuit 14 and confirms whether or not it coincides with the target address (X−2) (step S103). If the target address (X−2) and the address information do not coincide (if NO), the processing routine is returned to step S103. If the target address (X−2) and the address information coincide at time T1 in FIG. 6 (if YES), the process of step S103 is finished and the recording power is obtained (step S104). Further, the defocus amount corresponding to the obtained recording power is calculated (step S105). The bias level adapted to cause the defocus of the calculated amount is calculated (step S106). Further, the bias level of the polarity opposite to that of the calculated bias level is set into the bias setting circuit 114-a in the focusing error signal generation circuit 11 (step S107).

After that, the control circuit 21 starts the time measurement by using the built-in timer (step S108) and monitors whether or not the address information and the recording start address X coincide (step S109). If the address information and the recording start address X do not coincide in step S109 (if NO), the processing routine is returned to step S109. If the address information and the recording start address X coincide at time T2 in FIG. 6 (if YES), the process of step S109 is finished and the recording start is instructed to the signal processing circuit 19 (step S110). It is also possible to use such a construction that the signal processing circuit 19 monitors the address information, detects that the address information coincides with the recording start address X, and starts the recording. In such a case, steps S109 and S110 can be omitted.

After that, the control circuit 21 obtains the time measured by the timer and monitors whether or not the predetermined time P1 has elapsed (step S111). If the predetermined time P1 does not elapse yet in step S111 (if NO), the processing routine is returned to step S111. If the predetermined time P1 has elapsed (if YES), the process of step S111 is finished. The set value in the bias setting circuit 114-a is returned to the 0 level, thereby recovering the bias level (step S112). This timing is time T3 in FIG. 6.

The control circuit 21 finishes the correcting process of the defocus by the above processes (step S113).

Since the defocus correcting process executed in the embodiment 1 is executed by the software processes in the embodiment 2, the costs are low.

Embodiment 3

Although the focus bias (−BL) is set at time T1 in FIG. 6 in the embodiments 1 and 2, the defocus occurs transiently at that time. As the recording power increases, the bias level to be set rises, so that the defocus amount also increases. In this case, tracking performance of the focusing servo is insufficient and there is a danger that the focusing servo is not performed. In the embodiment, therefore, a construction in which even when the set bias level is relatively high, the focusing servo is stabilized and can operate will be described.

A construction of an optical disc apparatus in the embodiment 3 is substantially the same as that in FIG. 1 in the embodiment 1 except that the operation of the bias control circuit 18 differs.

It is a feature of the embodiment that when the focus bias is changed, the bias level is divided into a plurality of levels and set.

Figure 13:
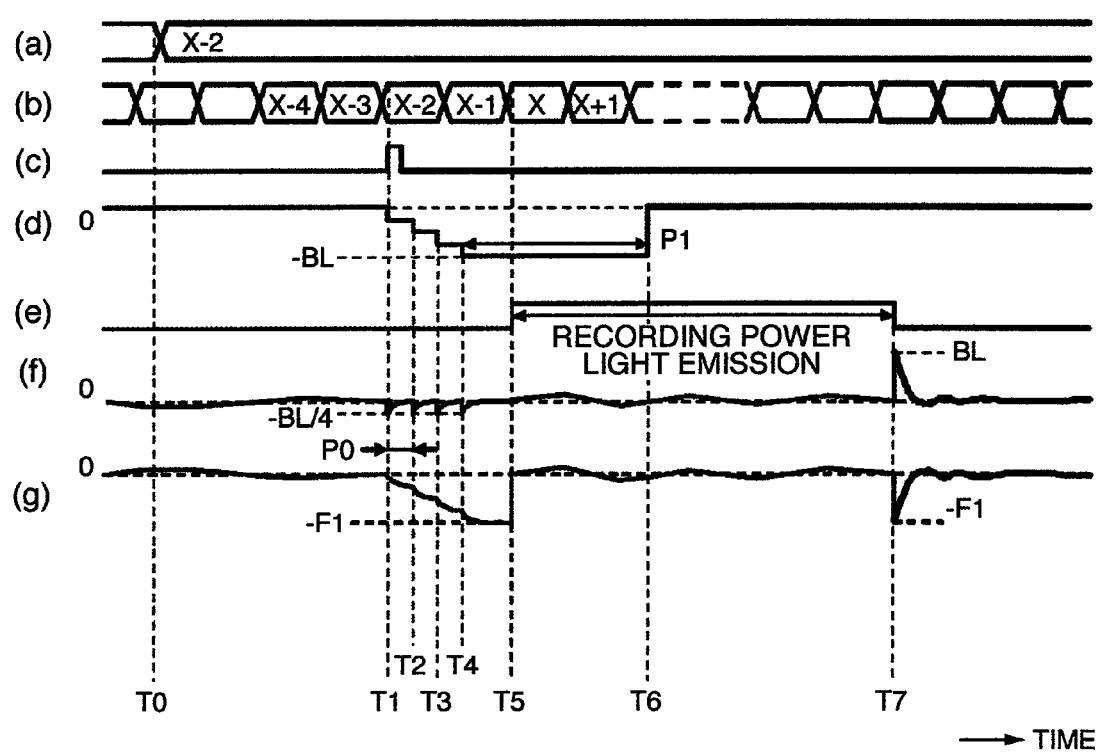
FIG. 13 is a waveform diagram for explaining an example of the defocus correcting operation (embodiment 3, embodiment 4)

FIG. 13 is a waveform diagram showing an example of the defocus correcting operation in the embodiment 3. Each waveform in the diagram is an output waveform of each component element in FIG. 1 in a manner similar to FIG. 6.

The control circuit 21 sets the target address (X−2) into the target address storing unit 15 at time T0 in a manner similar to the embodiment 1.

When the target address (a) and the address information (b) coincide at time T1 in FIG. 13, the comparing circuit 16 outputs the signal of the High pulse (waveform (c)). When the High pulse of the output (c) of the comparing circuit is detected, the bias control circuit 18 sets the bias level corresponding to the defocus amount which is supplied from the bias calculating circuit 17 into the bias setting circuit 114-a in the focusing error signal generation circuit 11. In the embodiment, the bias level (−BL) adapted to cause the defocus amount (−F1) described in FIG. 3 is divided into N stages (N is an integer of 2 or more), for example, into four stages and is set (waveform (d)). That is, the bias level which is changed per time is equal to (−BL/4). As a period adapted to change the bias level, it is changed every period P0 shown in FIG. 13. In consideration of the servo convergence time (about 200 μsec) described in the embodiment 1, the period P0 is set to a period longer than it, for example, it is set to 400 μsec.

When (−BL/4) is set into the bias level (d) at time T1, the FE signal (f) changes transiently to the same level as the bias level (−BL/4). However, if the focusing servo traces and is stabilized, it is converged to the 0 level again. At this time, the defocus amount (g) is converged to (−F1/4) corresponding to the bias level (−BL/4).

After that, when (−2×BL/4) is set into the bias level (d) at time T2, the FE signal (f) changes transiently to the same level as (−BL/4) corresponding to the change amount of the bias level. However, if the focusing servo traces and is stabilized, it is converged to the 0 level again. The defocus amount (g) is converged to (−2×F1/4) corresponding to the bias level (−2×BL/4).

Similarly, when (−3×BL/4) is set into the bias level (d) at time T3 and T4, the FE signal (f) changes transiently to the same level as (−BL/4) corresponding to the change amount of the bias level. However, if the focusing servo traces and is stabilized, it is converged to the 0 level again. The defocus amount (g) is converged to (−3×F1/4) and (−BL) corresponding to each bias level, respectively.

When the address information (b) coincides with the recording start address X at time T5 in this state, the data recording operation is started to the optical disc 1 and the WGATE signal (e) is set to the High level. Therefore, the switching circuit 115 in the focusing error signal generation circuit 11 is switched to the input terminal b side.

When the recording is started, the light emitting power of the laser diode 3 rises and the defocus F1 associated with the chromatic aberration occurs momentarily. However, at time T5, since the focusing servo is operating by the defocus amount (−F1) of the polarity opposite to that of the amount F1 of defocus which occurs, the amount F1 of defocus which occurs in association with the occurrence of the chromatic aberration is set off. Therefore, the defocus amount (g) is set to 0 and the transient level change does not occur in the FE signal (f). Since the occurrence of the defocus at the start of the recording can be prevented by the above operation, the good recording quality in the recording start portion can be held.

The bias control circuit 18 sets the final bias level (−BL) at time T4 and subsequently returns the bias level (d) to the 0 level at time T6 after the elapse of the predetermined time P1. It is desirable here that the timing for returning the bias level (d) to the 0 level is located at a point of time during the recording period of time. This is because, as mentioned in the embodiment 1, since the switching circuit 115 in the focusing error signal generation circuit 11 has been switched to the input terminal b side and the output signal of the bias setting circuit 114 is not used during the recording period of time, even if the bias level (d) is changed during the recording, no influence is exerted on the focusing servo operation.

When the recording operation is finished at time T7, since the WGATE signal (e) is set to the Low level, the switching circuit 115 in the focusing error signal generation circuit 11 is switched to the input terminal a side. At this time, the bias level (d) has been returned to the 0 level. In this instance, the light emitting power of the laser diode 3 is switched from the recording power to the reproducing power. Therefore, the defocus amount (−F1) of the polarity opposite to that at the start of the recording occurs and the FE signal (f) changes to the level BL corresponding to the defocus amount (−F1). However, when the focusing servo traces and is stabilized, the FE signal (f) is converged to the 0 level again.

The operation to return the bias level (d) to 0 is not limited to that described above but another operation example disclosed in the embodiment 1 may be used.

Although the construction in which the focus bias (d) is divided into four and set has been used in the embodiment, the number of dividing times is a design item and may be set to another number of dividing times.

The updating period P0 is also a design item and may be set to an arbitrary value which is equal to or longer than such a time that the servo convergence time can be assured. For example, in the case where when the recording speed is low, low band servo characteristics are switched and used, and when the recording speed is high, high band servo characteristics are switched and used, the servo convergence time differs every servo characteristics. Therefore, the updating period may be switched in accordance with each servo characteristics.

Since the bias level is divided into a plurality of stages and set in the embodiment 3, a time which is required until the defocus amount (g) is converged to (−F1) after the change in bias level (d) was started is longer than that in each of the embodiments 1 and 2. Therefore, the offset amount of the target address (a) for the recording start address X can be set to a value larger than those in the embodiments 1 and 2. More specifically speaking, (X−4) or the like is set into the target address (a) at tie T0. It is sufficient to properly set the offset amount as a design item.

Although the operation to change the bias level (d) step by step has been executed in the embodiment, the operation to continuously change the bias level (d) from the 0 level to (−BL) may be executed.

Embodiment 4

Although the operation to correct the defocus at the start of the recording by the hardware processes has been described in the embodiment 3, the operation to correct the defocus at the start of the recording by software processes will be described in the embodiment 4.

An optical disc apparatus in the embodiment has a construction shown in FIG. 9 in a manner similar to the embodiment 2. In the embodiment, the recording start address adapted to start the recording of information onto the optical disc is set to X and the target address adapted to make the defocus correction is set to (X−2) in a manner similar to the embodiment 3. Operation waveforms in the embodiment are substantially the same as those in FIG. 13 in the embodiment 3.

Figure 14:
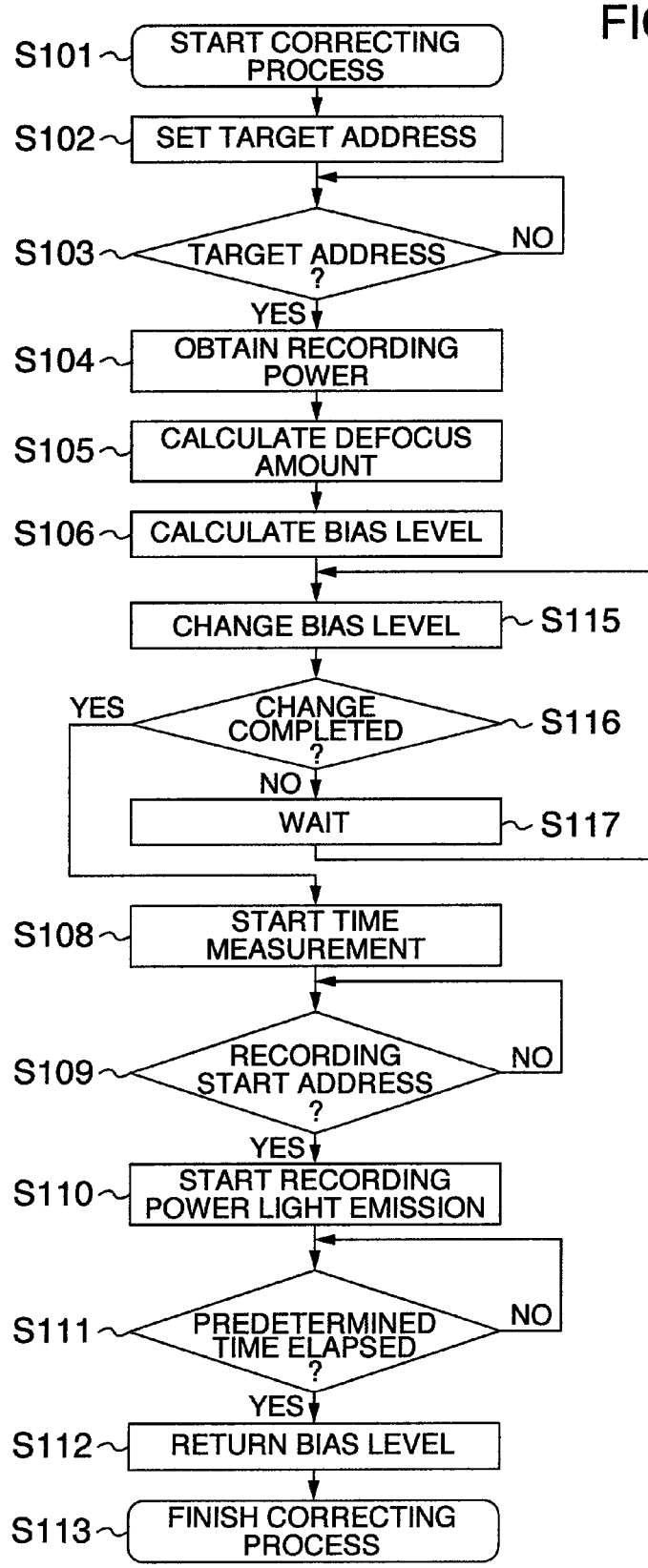
FIG. 14 is a flowchart showing an example of the defocus correcting operation (embodiment 4).

FIG. 14 is a flowchart showing an example of the defocus correcting operation in the embodiment. This processing flow is executed by the control circuit 21 by the software processes. In FIG. 14, substantially the same operations as those in FIG. 10 showing the flowchart of the embodiment 2 are designated by the same reference numerals and their description is omitted here.

When the correcting process is started (step S101), the control circuit 21 executes a series of operations up to the calculation of the bias level (step S106) in a manner similar to the embodiment 2. For example, the calculated bias level is assumed to be (−BL) in a manner similar to the embodiment 3.

After that, the control circuit 21 changes the bias level into the bias setting circuit 114-a in the focusing error signal generation circuit 11 at time T1 in FIG. 13 (step S115). An amount of bias level which is changed here is set to (−BL/4) in a manner similar to the embodiment 3.

After step S115, the control circuit 21 compares the setting in the bias setting circuit 114-a with the calculated bias (−BL) and discriminates whether or not the change of the bias level has been completed (step S116). If a comparison result indicates that they do not coincide, it is determined that the change of the bias level is not completed yet (If No), and a waiting process of a predetermined time is executed (step S117). It is assumed that the predetermined time is equal to the period P0 shown in FIG. 13 in a manner similar to the embodiment 3.

After step S117, the control circuit 21 returns the processing routine to step S115 again and sets (−2×BL/4) obtained by further changing (−BL/4) as a present set value by (−BL/4) into the bias setting circuit 114-a at time T2 in FIG. 13.

Subsequently, since the operations are similarly repeated in order of steps S116, S117, and S115, the bias level (d) is set to (−3×BL/4) and (−BL) at time T3 and T4 in FIG. 13, respectively.

When the bias level (d) is set to (−BL) at time T4, since the comparison result in step S116 indicates that they coincide, the control circuit 21 determines that the change of the bias level has been completed (If Yes), finishes step S116, and starts the time measurement using the timer (step S108).

Subsequently, the control circuit 21 executes steps S109 to S112 in a manner similar to the embodiment 2 and finishes the defocus correcting process (step S113).

By the operation mentioned above, according to the embodiment, since the occurrence of the defocus at the start of the recording can be prevented by the operation similar to that in the embodiment 3, the good recording quality in the recording start portion can be held.

In the waveform diagrams of FIGS. 6 and 13 describing the operations in the embodiments 1 to 4, the bias level (d) until time T1 has been set to the 0 level. However, the invention is not limited to the setting to the 0 level. For example, if such a bias level as to optimize information reproducing performance from the optical disc 1 is set, the information can be preferably reproduced until time T1. Therefore, for example, the portion which has already been recorded is reproduced until time T1, whether or not a reproduction error does not occur is confirmed, and if there is no problem as a result of the confirmation, the recording operation can be continuously executed as it is.

The invention is not limited to the foregoing embodiments but many modifications are incorporated. For example, the foregoing embodiments have been described in detail in order to describe the invention so as to be easily understood and are not always limited to the case including all of the constructions described above. A part of the constructions of a certain embodiment can be also added to the construction of another embodiment. With respect to a pat of the constructions of each embodiment, another construction can be added, deleted, or replaced.

The optical system of the optical disc apparatus and the forming system of the servo error signal as targets of the invention are not limited to those described in the embodiments but, for example, a well-known knife-edge system or the like may be used as a forming system of the FE signal.

Although the focusing error signal generation circuit 11 shown in FIG. 2 has the construction in which the 0 level is supplied as a bias level upon recording to the input terminal b side of the switching circuit 115, the bias upon recording is not limited to the 0 level but may be set to another bias level so as to keep the good recording quality.

Further, each of the foregoing embodiments may be constructed by hardware or can be also constructed so that a part or all of them are realized by executing a program by a processor. The control lines and information lines which are considered to be necessary in the description are shown and do not always show all control lines and information lines on products. Actually, it may be considered that almost all of the constructions are mutually connected.

According to the embodiments, the chromatic aberration correcting optical element becomes unnecessary and the costs of the optical pickup and optical disc apparatus can be reduced. The defocus at the start of the recording can be corrected for an arbitrary optical recording power and the good recording quality in the recording head portion can be held. Further, as the number of OPC execution possible times per optical disc, a value similar to that in the related art can be held.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc apparatus for recording information onto an optical disc, comprising:
   a laser light source for emitting a laser beam;
   an objective lens for converging said laser beam and irradiating onto said optical disc;
   optical detecting module which has said laser light source and said objective lens and optically reads the information recorded on said optical disc;
   signal generation module for generating a focusing error signal by using an output of said optical detecting module;
   recording control module for controlling the recording of the information onto said optical disc;
   light emission control module for controlling the light emission of said laser light source in accordance with an output of said recording control module;
   focus control module for allowing a light spot of said laser beam to execute a tracking operation to a recording surface of said optical disc by using said focusing error signal;
   address detecting module for detecting an address of said optical disc by using an output of said optical detecting module;

address storing module for storing a predetermined address which is located before a recording start address by a predetermined offset;

comparing module for comparing the address which is outputted by said address detecting module with said predetermined address;

bias calculating module for calculating a bias level in accordance with a recording power; and defocus control module for generating a predetermined defocus amount in said tracking operation, wherein when said comparing module detects that the address which is outputted by said address detecting module coincides with said predetermined address, said defocus control module is set to generate a predetermined defocus amount in accordance with the bias level calculated by said bias calculating module.

2. The apparatus according to claim 1, wherein when said recording control module starts the recording operation of the information, the setting of said defocus control module is changed to another setting.

3. The apparatus according to claim 1, wherein said defocus control module is set by one time.

4. The apparatus according to claim 1, wherein said defocus control module is set step by step.

5. The apparatus according to claim 1, wherein said defocus control module is continuously set.

6. The apparatus according to claim 1, wherein said defocus control module further comprises:

first and second signal correcting module each for applying a predetermined offset signal to said focusing error signal; and switching module for switching and outputting an output signal of said second signal correcting module when said recording control module is in a state of the recording operation and for switching and outputting an output signal of said first signal correcting module when said recording control module is in a state other than the recording operation, and wherein said first signal correcting module is set in accordance with the bias level calculated by said bias calculating module and said focus control module executes said tracking operation by using an output of said switching module.

7. The apparatus according to claim 6, further comprising time measuring module for measuring a time, wherein after said comparing module detected that the address which is outputted by said address detecting module coincides with said predetermined address, when an output of said time measuring module reaches a predetermined value, the setting of said first signal correcting module is returned to an original setting.

8. The apparatus according to claim 6, further comprising time measuring module for measuring a time, wherein when an output of said time measuring module reaches a predetermined value after the recording operation to said optical disc was started, the setting of said first signal correcting module is returned to an original setting.

9. The apparatus according to claim 6, wherein an output of said address detecting module reaches a predetermined value during the recording of the information onto said optical disc, the setting of said first signal correcting module is returned to an original setting.

10. An apparatus according to claim 6, wherein after the recording of the information onto said optical disc was finished, the setting of said first signal correcting module is returned to an original setting.

11. The apparatus according to claim 1, wherein said defocus control module further comprises:

first and second signal correcting module each for correcting a balance of said focusing error signal; and switching module for switching and outputting an output signal of said second signal correcting module when said recording control module is in a state of the recording operation and for switching and outputting an output signal of said first signal correcting module when said recording control module is in a state other than the recording operation, and wherein said first signal correcting module is set in accordance with the bias level calculated by said bias calculating module and said focus control module executes said tracking operation by using an output of said switching module.

12. The apparatus according to claim 1, wherein said predetermined offset differs in accordance with a recording speed and a recording start address.

* * * * *